(12) United States Patent
Abels et al.

(10) Patent No.: US 8,835,038 B2
(45) Date of Patent: Sep. 16, 2014

(54) BATTERY CELL COOLER

(75) Inventors: Kenneth Abels, Oakville (CA); Alan Wu, Kitchener (CA); John Burgers, Oakville (CA); Peter Zurawel, Mississauga (CA); Zia Shahidi, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 39 days.

(21) Appl. No.: 13/423,385

(22) Filed: Mar. 19, 2012

(65) Prior Publication Data

US 2012/0237805 A1 Sep. 20, 2012

Related U.S. Application Data

(60) Provisional application No. 61/454,273, filed on Mar. 18, 2011.

(51) Int. Cl.
| | |
|---|---|
| H01M 4/505 | (2010.01) |
| H01M 4/525 | (2010.01) |
| H01M 4/02 | (2006.01) |
| H01M 10/647 | (2014.01) |
| H01M 10/6557 | (2014.01) |
| H01M 10/6567 | (2014.01) |
| H01M 2/10 | (2006.01) |
| H01M 10/625 | (2014.01) |
| H01M 10/613 | (2014.01) |
| H01M 10/0525 | (2010.01) |

(52) U.S. Cl.
CPC ........ *H01M 10/5004* (2013.01); *Y02T 10/7011* (2013.01); *H01M 10/5032* (2013.01); *H01M 10/5059* (2013.01); *H01M 10/0525* (2013.01); *H01M 10/5075* (2013.01); *H01M 2/1077* (2013.01); *H01M 10/5016* (2013.01); *Y02E 60/12* (2013.01)
USPC .......................................................... 429/120

(58) Field of Classification Search
USPC .................................. 429/120; 165/164–170
See application file for complete search history.

(56) References Cited

U.S. PATENT DOCUMENTS

| | | | |
|---|---|---|---|
| 258,762 A | 5/1882 | Hyatt | |
| 2,819,883 A | 1/1958 | Rieppel et al. | |
| 3,424,238 A | 1/1969 | Leeds et al. | |
| 4,081,025 A * | 3/1978 | Donaldson | 165/140 |
| 4,210,127 A | 7/1980 | Kleine et al. | |
| 6,274,262 B1 | 8/2001 | Canfield | |

(Continued)

FOREIGN PATENT DOCUMENTS

EP 2065963 A2 6/2009

*Primary Examiner* — Muhammad Siddiquee
(74) *Attorney, Agent, or Firm* — Marshall & Melhorn, LLC

(57) ABSTRACT

A battery cell cooler containing a pair of complementary plates. The pair of complementary plates together forms a tubular flow passage and one or more tubular sections. The flow passage has an inlet end, an outlet end and dimples or ribs along the length of the flow passage. The one or more tubular sections have an inlet duct and an outlet duct, the inlet duct being coupled to an expanded receptacle at the inlet end and in fluid communication with the inlet end of the flow passage and the outlet duct being coupled to an expanded receptacle, at the outlet end and in fluid communication with the outlet end of the flow passage. Also, disclosed is a device containing a battery cell sandwiched between a pair of battery cell coolers, as described herein. Further disclosed is a method for forming the battery cell cooler, as described herein.

14 Claims, 13 Drawing Sheets

(56) References Cited

U.S. PATENT DOCUMENTS

| | | |
|---|---|---|
| 6,793,015 B1 | 9/2004 | Brown et al. |
| 6,942,019 B2 | 9/2005 | Pikovsky et al. |
| 7,044,207 B1 | 5/2006 | Guidat et al. |
| 7,169,502 B2 | 1/2007 | Garceau |
| 7,658,224 B2 | 2/2010 | Beech |
| 7,851,080 B2 | 12/2010 | Weber et al. |
| 2002/0005275 A1* | 1/2002 | O'Donnell et al. ......... 165/109.1 |
| 2003/0178182 A1* | 9/2003 | Pikovsky et al. ............ 165/80.4 |
| 2006/0000588 A1* | 1/2006 | Kang et al. ..................... 165/170 |
| 2007/0227697 A1* | 10/2007 | Takahashi ..................... 165/80.4 |
| 2008/0090123 A1 | 4/2008 | Peng et al. |
| 2009/0258289 A1* | 10/2009 | Weber et al. .................. 429/120 |
| 2011/0162820 A1 | 7/2011 | Weber et al. |
| 2011/0212355 A1 | 9/2011 | Essinger et al. |
| 2011/0316271 A1* | 12/2011 | Lalam ........................... 285/179 |

\* cited by examiner

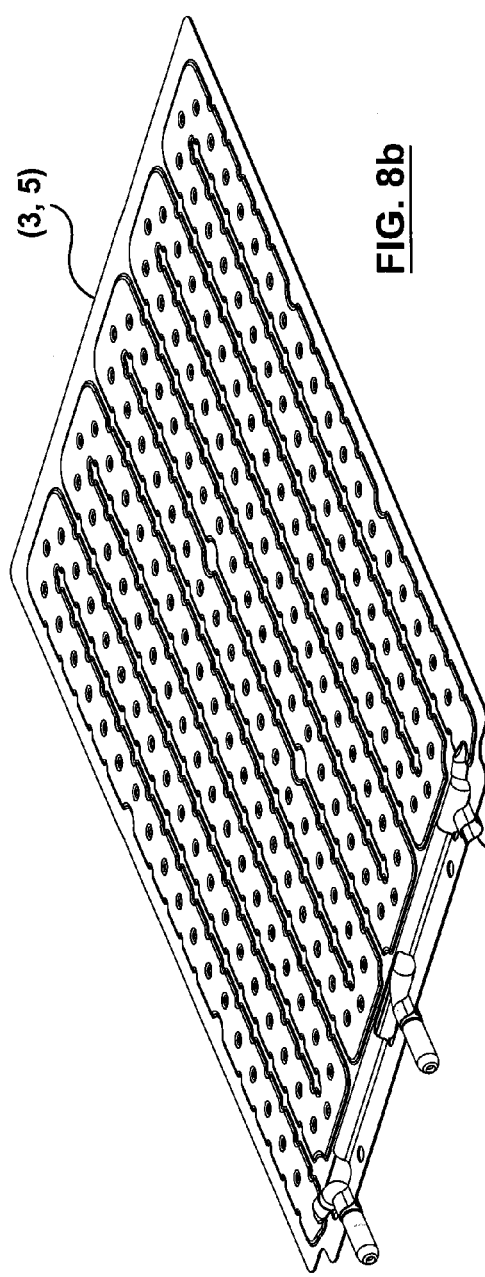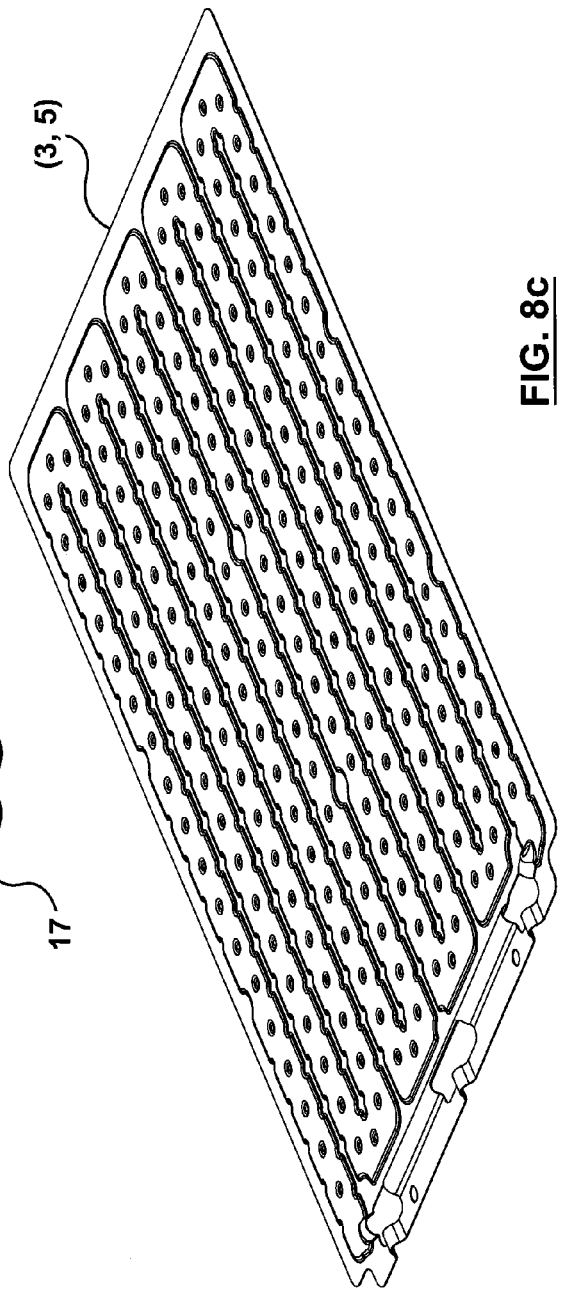

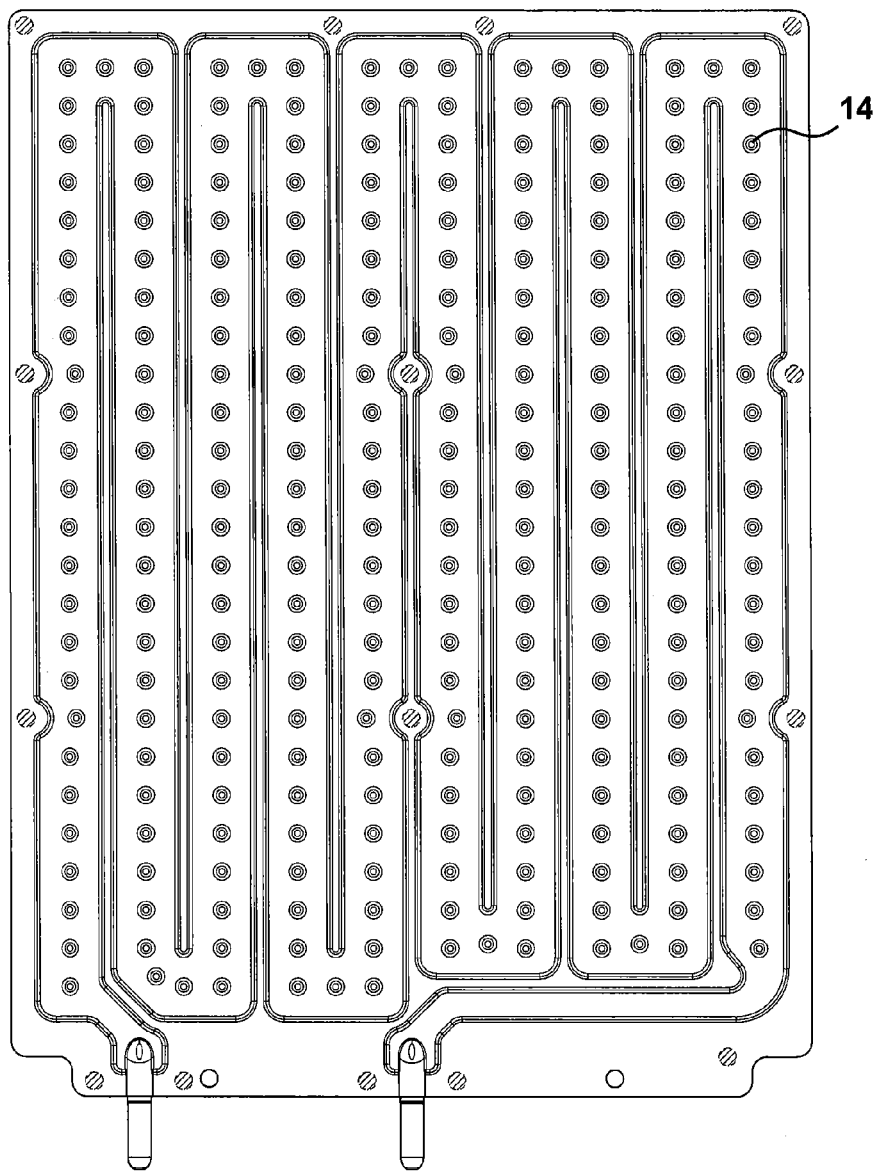
FIG. 9a          FIG. 9c
FIG. 9d

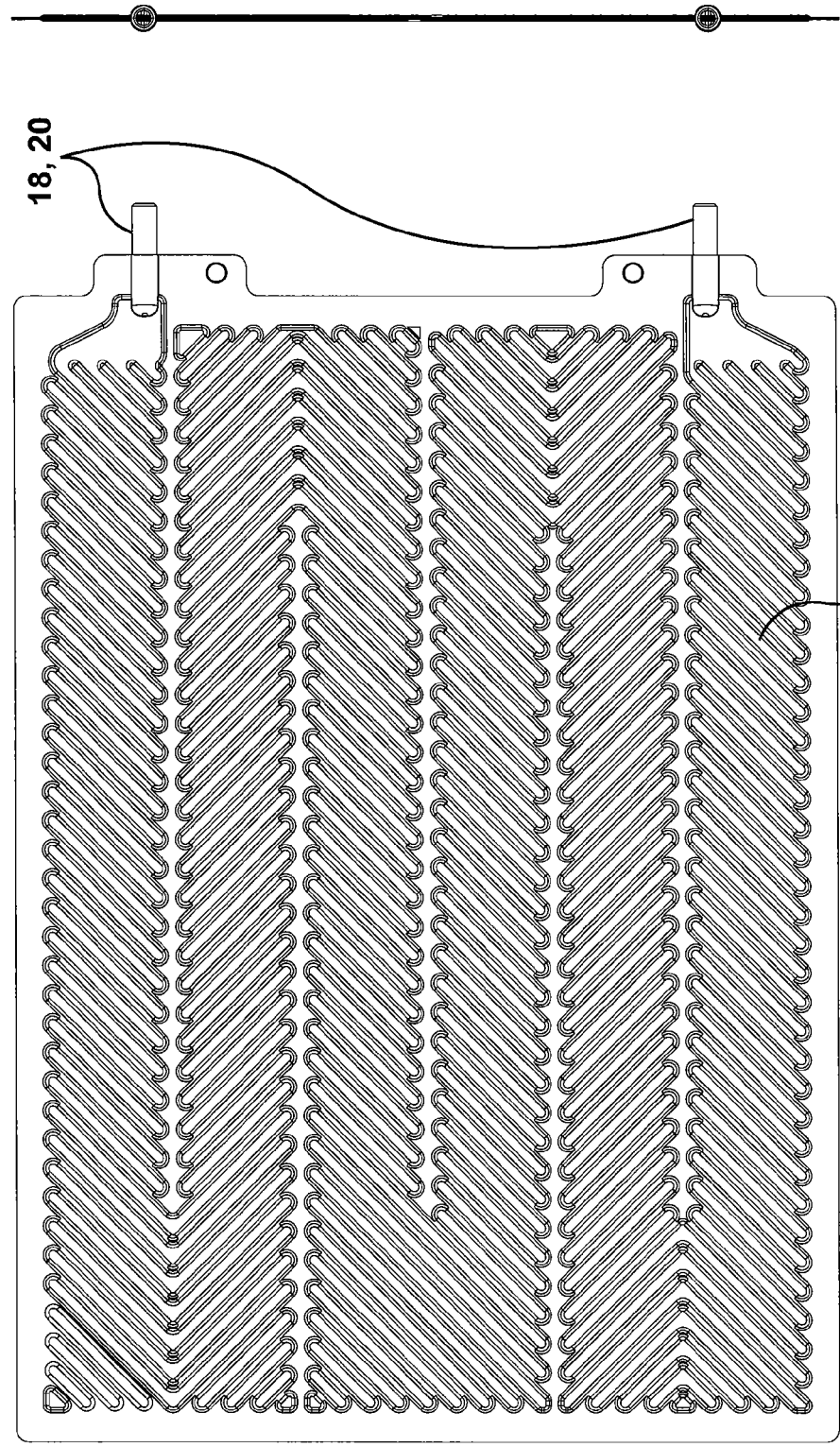

BATTERY CELL COOLER

CROSS-REFERENCE

This application claims priority from U.S. provisional patent application number U.S. 61/454,273, filed Mar. 18, 2011, incorporated herein by reference.

FIELD

This specification relates to a battery cell cooler.

BACKGROUND

Electric propulsion vehicles such as battery, plug-in hybrid battery, and other hybrid electric vehicles, require advanced battery systems that have high energy storage capacity, while also delivering reasonable battery life and cost. Lithium-ion batteries are a favoured technology solution due to their superior energy storage, relatively light weight, and high power density. But, when operating at the requisite high power density and close packed cell configurations, these batteries produce considerable and unevenly distributed waste heat, which can limit battery efficiency, energy storage capacity, safety, reliability and life. New battery thermal management solutions including battery cooling heat exchangers, are of increasing interest and application to maintain control over the operating temperature of these batteries, and thus to optimize battery performance and lifecycle.

Although a range of battery pack configurations and heat exchanger solutions exist, planar arrays of battery cells are commonly employed; and these may be preferentially cooled by liquid-cooled plate heat exchangers that are interspaced between individual cells. Close thermal contact between the plate heat exchangers and the battery cells, is used to conduct heat in the direction required to limit and modulate the battery operating temperature.

U.S. Pat. No. 7,851,080 describes a battery cooling plate design with discrete channels. The '080 Patent discloses battery cooling plates having wide channels that are subject to deformation during assembly line vacuum and fill processes due to insufficient strength of the channels. This '080 patent also discloses new art to improve this and other requirements for battery coolers.

U.S. Pat. No. 7,044,207 describes a heat exchange module, where two metal sheets welded along weld lines defining between them a group of channels disposed side by side substantially in a common plane, intended to be passed through by an exchange fluid and, from the fluidic point of view, being in parallel with each other between two connection orifices of the module. The group of channels has a generally U-shape configuration, which connects together the said connection orifices that are laterally separated from each other.

US Patent Publication Application No. 2008-0090123 discloses a fuel cell stack having a sealing structure for sealing gasses and cooling water. The sealing structure is also electrically insulative. The fuel cell stack includes O-ring beds that are combined to the gas flow plates and through which liquid flow holes cooling water passes, gaskets that surround the gas flow plate to prevent the leakage of the gasses, and O-rings that surround the flow channels of the cooling plates and the O-ring beds to prevent the leakage of the cooling water.

There is a need in the art for improved battery cell coolers that offer compact, thin, inter-cell placed cooling solutions, including liquid cooled plate coolers that are supplied with coolant from a common manifold. Such new improved battery coolers need to provide desired cell-contact heat transfer capabilities without incurring coolant-side pressure drops that may be too high for the automotive cooling system, while also providing flow channels having sufficient strength so that they do not deform during assembly line vacuum and coolant fill process.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
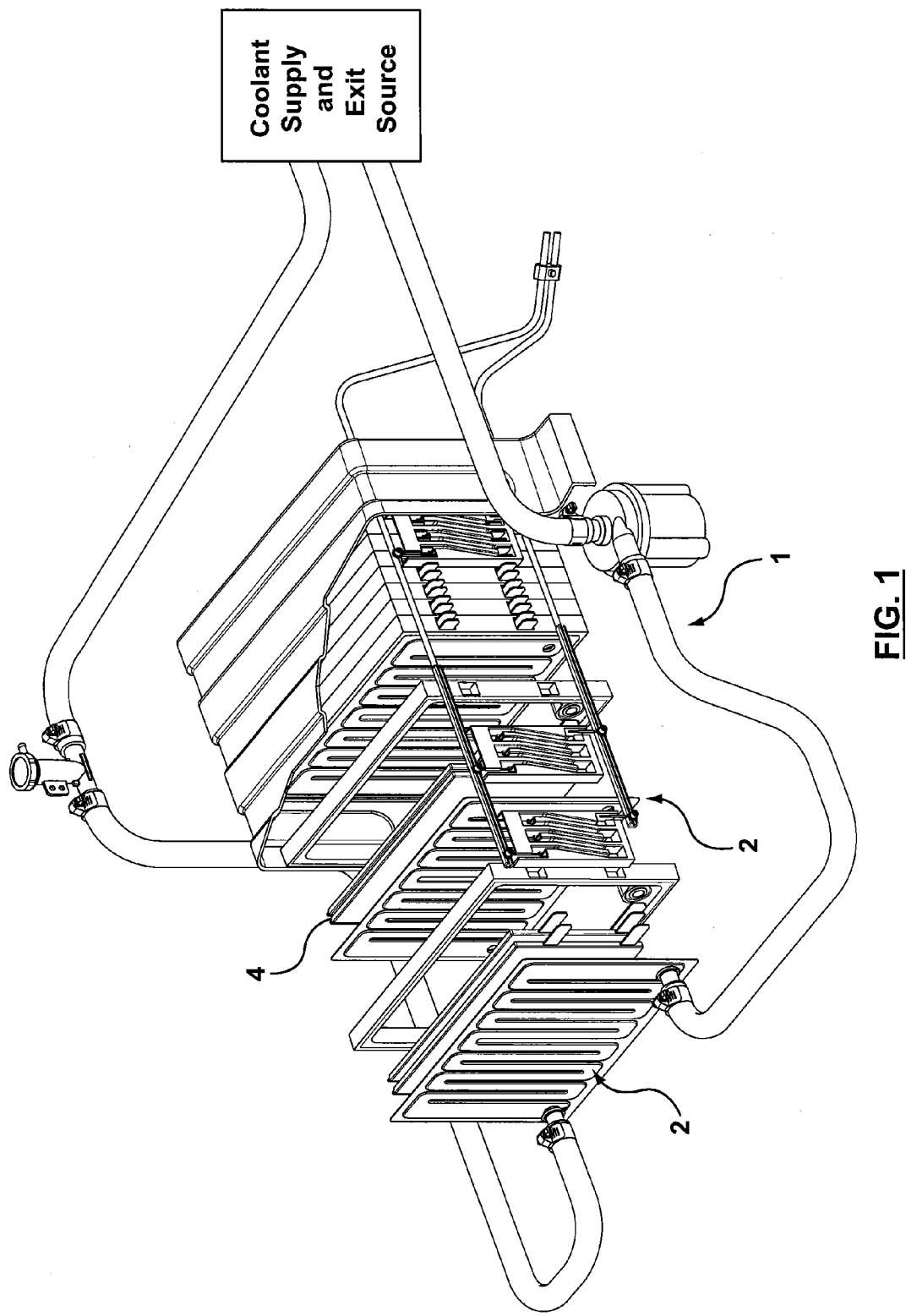
FIG. 1 discloses a device showing the battery cell sandwiched between a pair of battery coolers.

FIG. 1 discloses a device (1) containing a set of battery cell coolers (2) sandwiching a battery cell (4), or viewed in another way, a battery cell cooler (2) is sandwiched between battery cells (4). A number of battery cells (4) can be present in the device (1) with a battery cell cooler (2) being present between two adjacent battery cells (4) and also at the front and back ends of the device (1), such that all the battery cells (4) are sandwiched in between battery cell coolers (2). In an alternative embodiment, a battery cell (4) could be present at one or both ends of the device (1). As further shown in FIG. 1, a liquid coolant supply/exit is present, for example and without limitation, at the bottom edge of the vertically oriented plate coolers. In another embodiment, the liquid coolant supply can feed the coolant from a side edge of the plate coolers.

The battery cell cooler (2) (FIGS. 2-10) is formed by a pair of complementary plates (3, 5) (FIGS. 3 and 8), which together form a tubular flow passage (6). In some embodiments, as shown in FIGS. 5, 6, 7 and 9, the pair of complementary plates also provides one or more tubular sections (8) that are in fluid communication with the tubular flow passage (6). While other embodiments, as shown in FIGS. 2, 3, 4, 8 and 10, the one or more tubular sections (8) is absent. The flow passage (6) has an inlet end (10) and an outlet end (12), as shown in the figures. The inlet and outlet ends (10, 12) can be switched around so that the inlet end (10), as shown in the figures, is the outlet end (12), and vice versa, depending upon the application and need. In one embodiment, for example and without limitation, the tubular flow passages (6) are flat, to aid in thermal contact with the adjacent battery cells. Often, the tubular sections (8) are also flat, for the same reason.

In one embodiment, the battery cell cooler (2) is provided with an inlet duct (18) and an outlet duct (20). The inlet duct (18) is in fluid communication with the inlet end (10) of the flow passage (6) by an expanded receptacle (19) coupled to the inlet end (10), and the outlet duct (20) is in fluid communication with the outlet end (12) of the flow passage (6) by another expanded receptacle (21) coupled to the outlet end (12), as shown in FIGS. 2, 3, 4, 8 and 10, to allow cooling fluid to enter into the flow passage (6) from the inlet duct (18) and exit from the outlet duct (20). In one embodiment, notches (19, 21 in FIG. 8a) can be formed for clinching the inlet and outlet ducts (18, 20) to the expanded receptacles. In another embodiment, as shown in FIGS. 5, 6, 7 and 9, the inlet duct and/or outlet duct (18, 20) are coupled to expanded receptacles, which are fluidly coupled to the inlet and outlet ends (10, 12), respectively, via the one or more tubular sections (8). In a further embodiment, as disclosed in the figures, the inlet and outlet ducts can be present on the same end of the plates. In a still further embodiment, the inlet and outlet ducts are formed by tubes. In another still further embodiment, as shown in the figures, the inlet and outlet ducts (10, 12) have rounded off ends that can assist in insertion of the ducts in a manifold.

The expanded receptacle (19, 21), as disclosed herein, is adapted to receive the inlet and outlet ducts (18, 20), which in one embodiment is formed by round tubes. As shown in FIGS. 5, 6, 7 and 9, the expanded receptacle (19, 21) is formed as an extension from the flat tubular section (8), as the transition that allows the flat tubular section (8) to form a tube-like section, for receiving the inlet or outlet duct (18, 20). While in other embodiments (FIGS. 2, 3, 4 and 10), the expanded receptacle (19, 21) forms as an extension from the inlet and outlet ends (10, 12) of the tubular flow passage (6).

Figure 2:
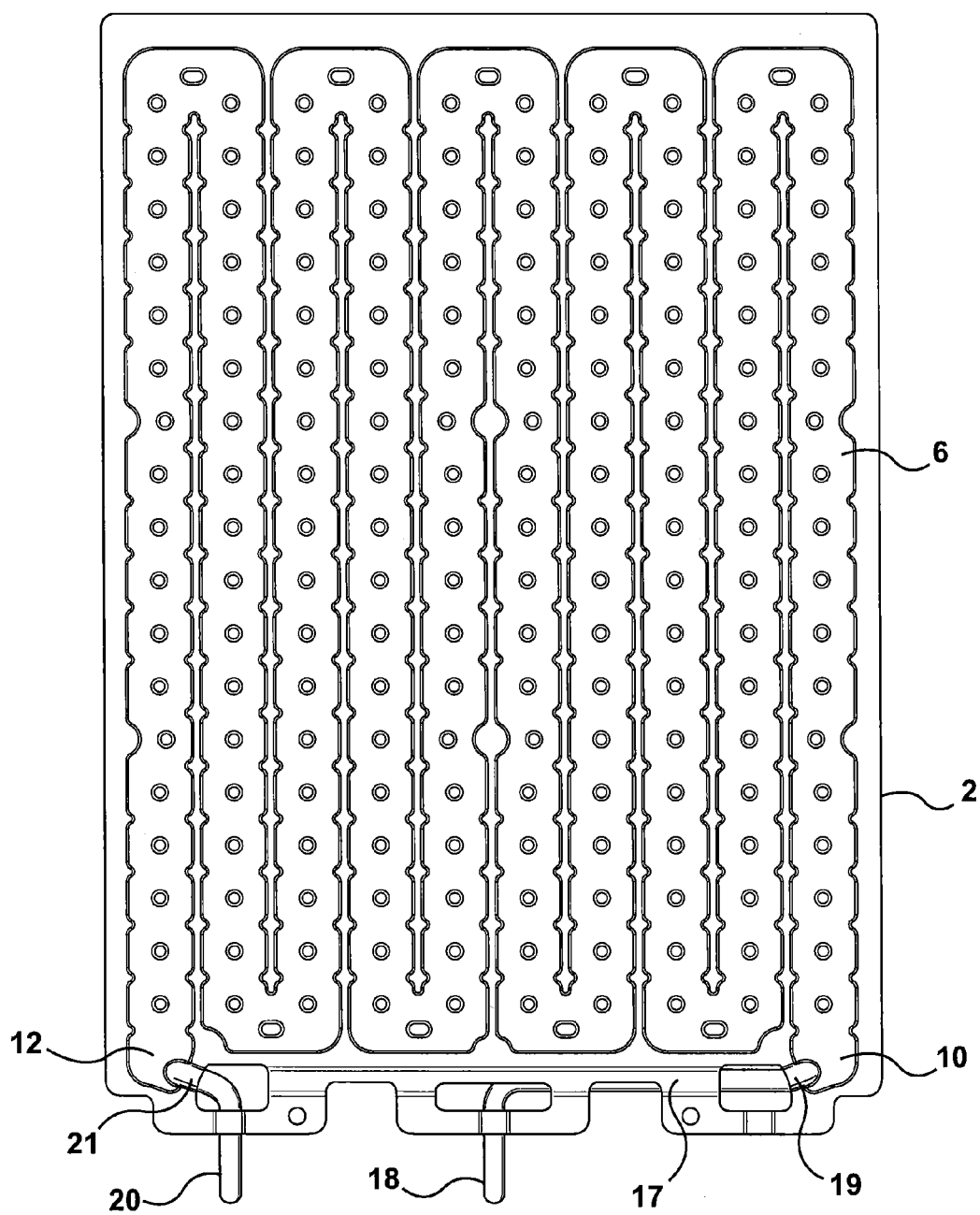
FIG. 2 discloses a plan view of a symmetric battery cell cooler having dimples, in accordance with one embodiment of the description.
Figure 3:
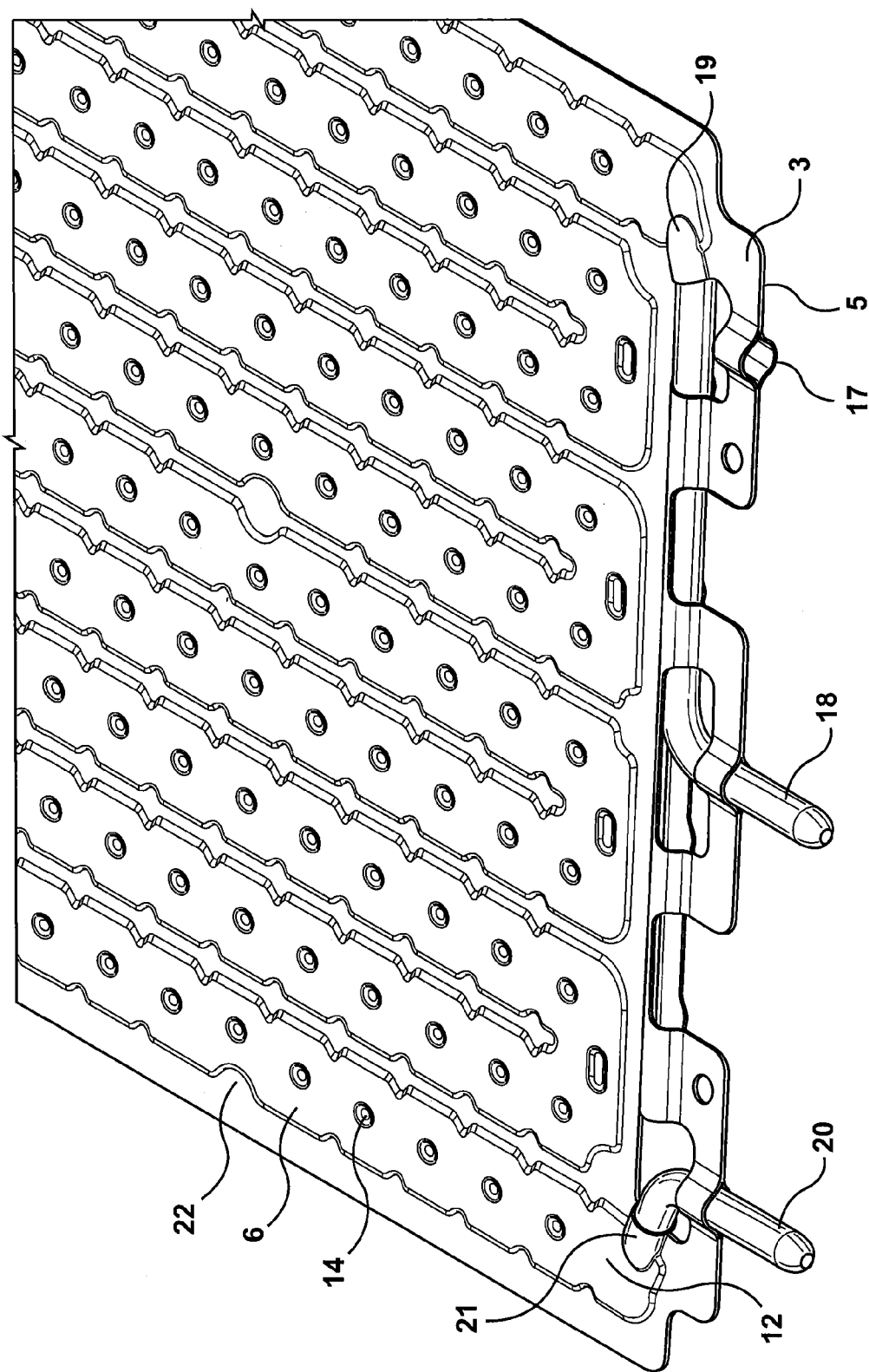
FIG. 3 discloses a perspective view of an expanded portion of a battery cell cooler disclosed in FIG. 2.
Figure 4:
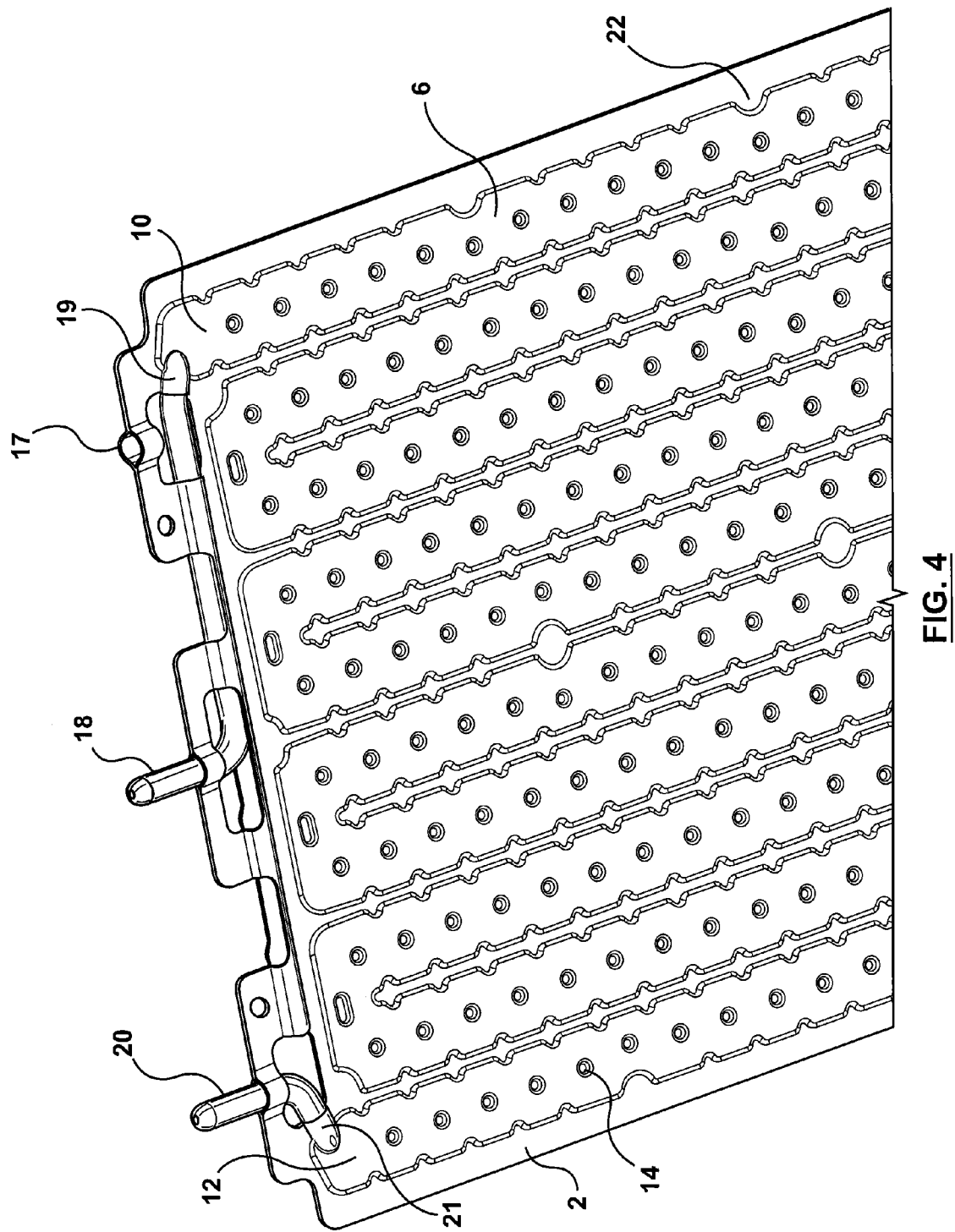
FIG. 4 discloses a portion of a battery cell cooler disclosed in FIG. 2.
Figure 5:
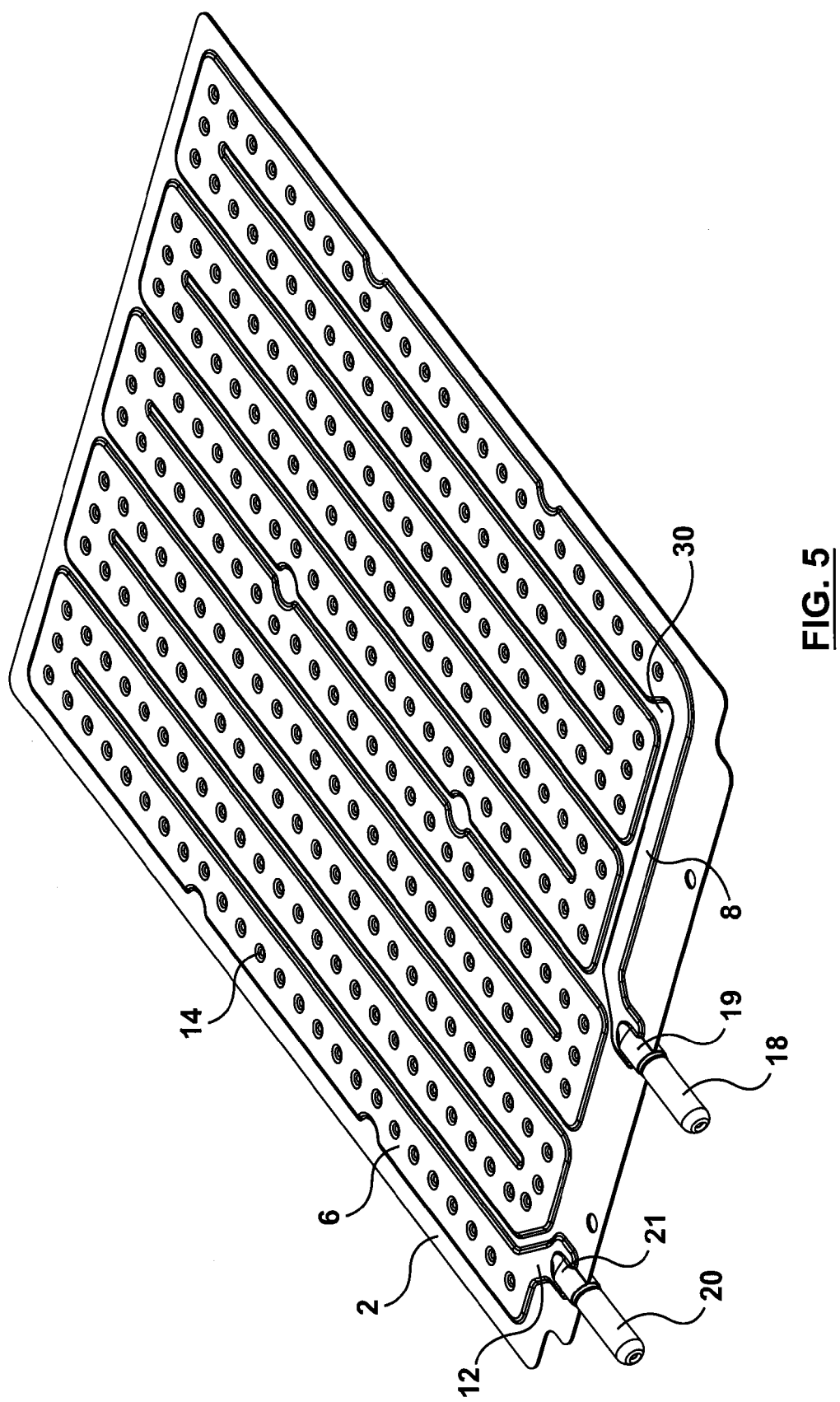
FIG. 5 discloses a perspective view of an asymmetric battery cell cooler having dimples, in accordance with another embodiment of the description.
Figure 6:
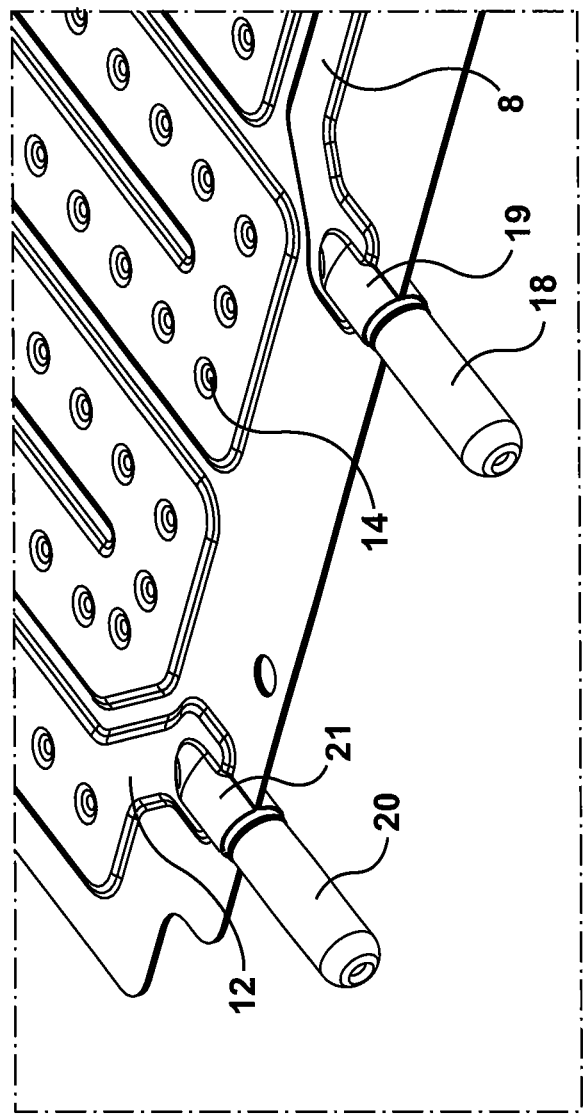
FIG. 6 discloses a perspective view of an expanded portion of a battery cell cooler disclosed in FIG. 5.
Figure 7:
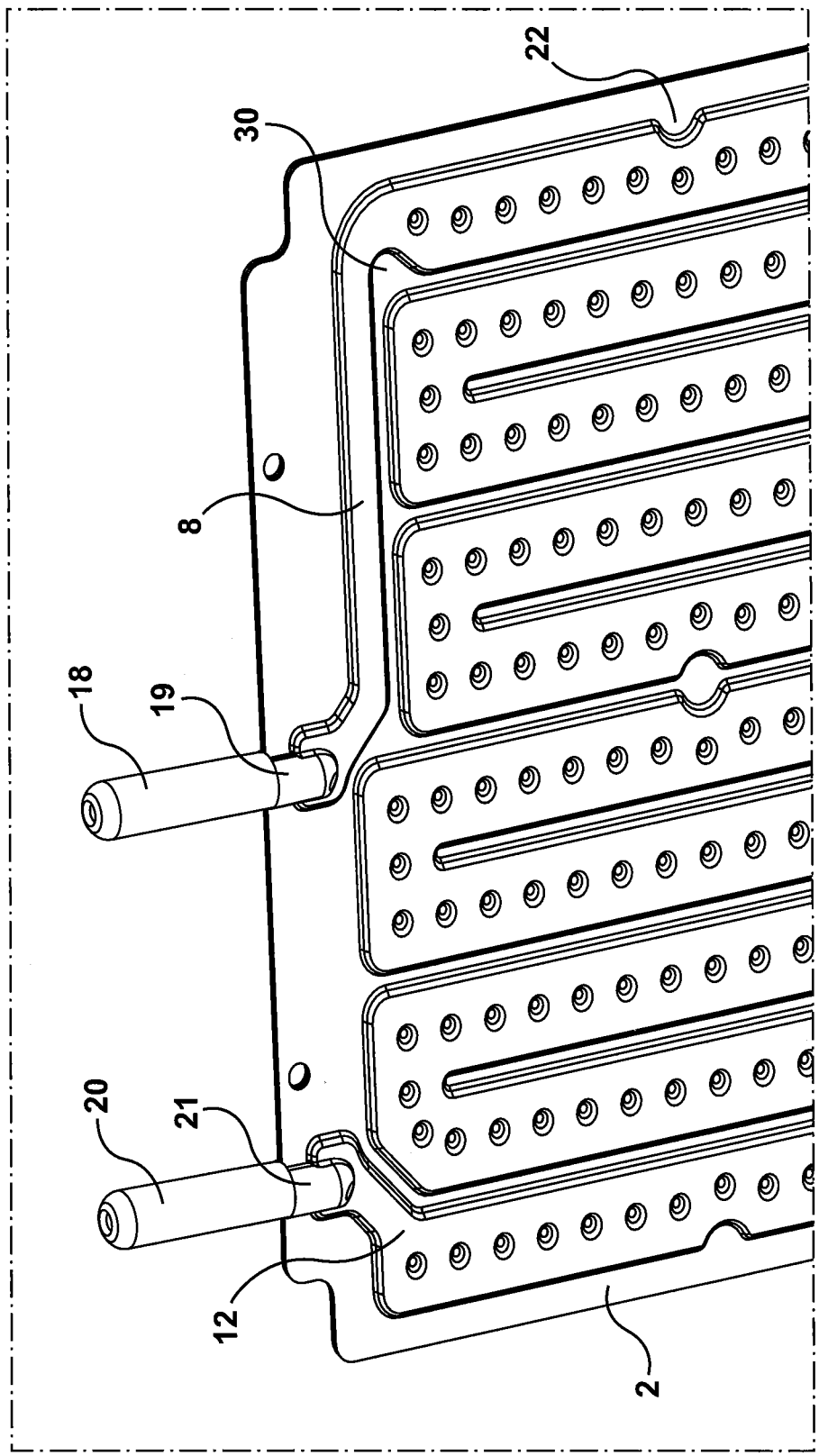
FIG. 7 discloses a portion of a battery cell cooler disclosed in FIG. 5.
Figure 8A:
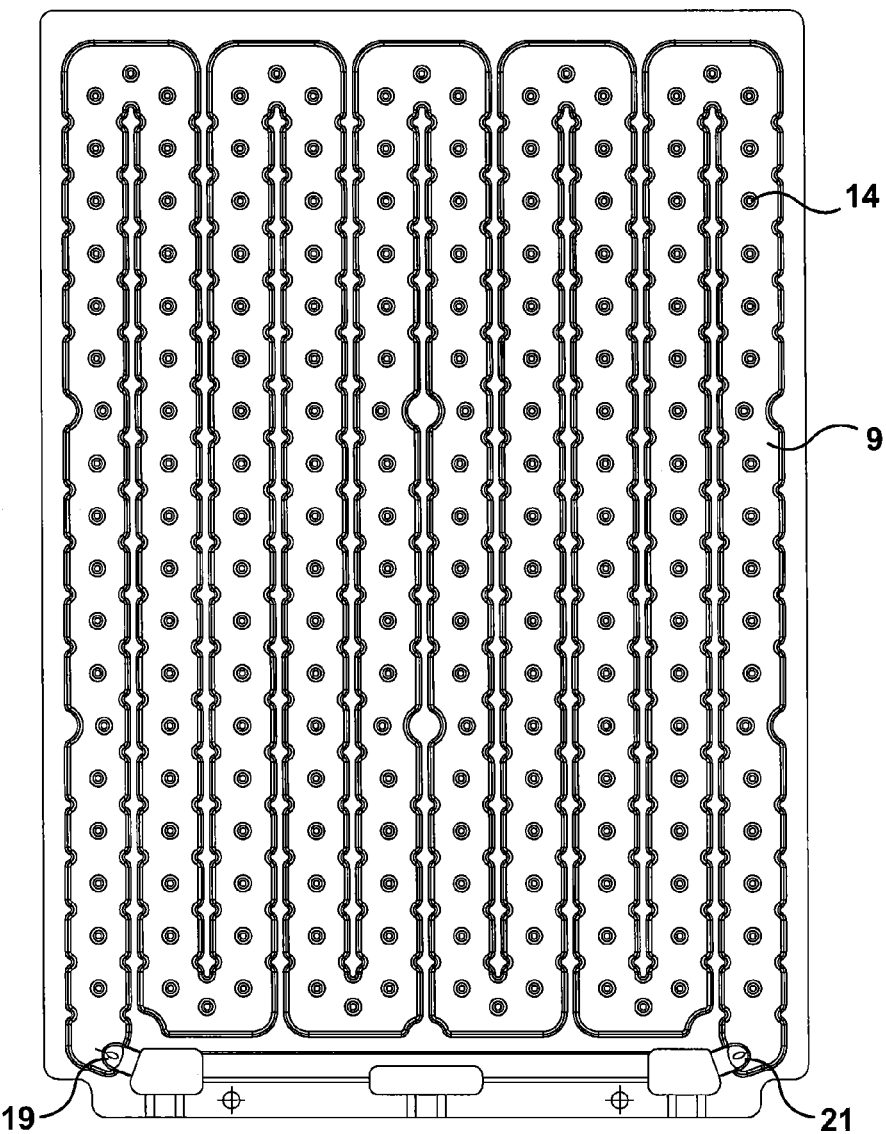
FIG. 8 (a-d) disclose a battery cell cooler in accordance with one embodiment of the description.
Figure 8D:
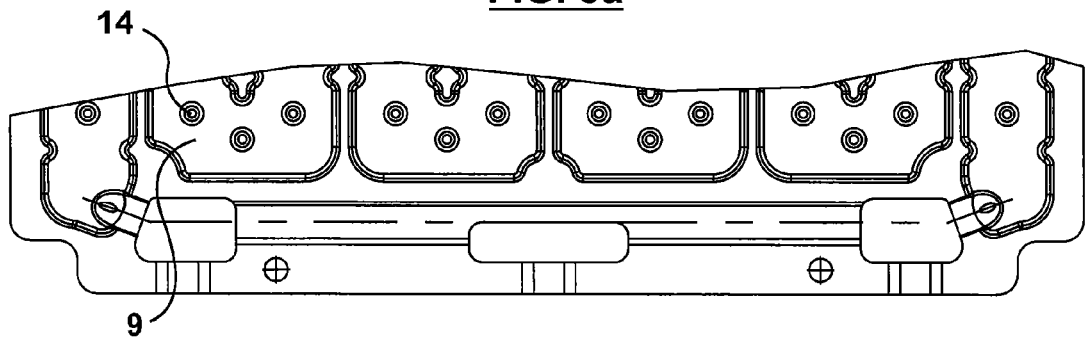
Figure 9B:
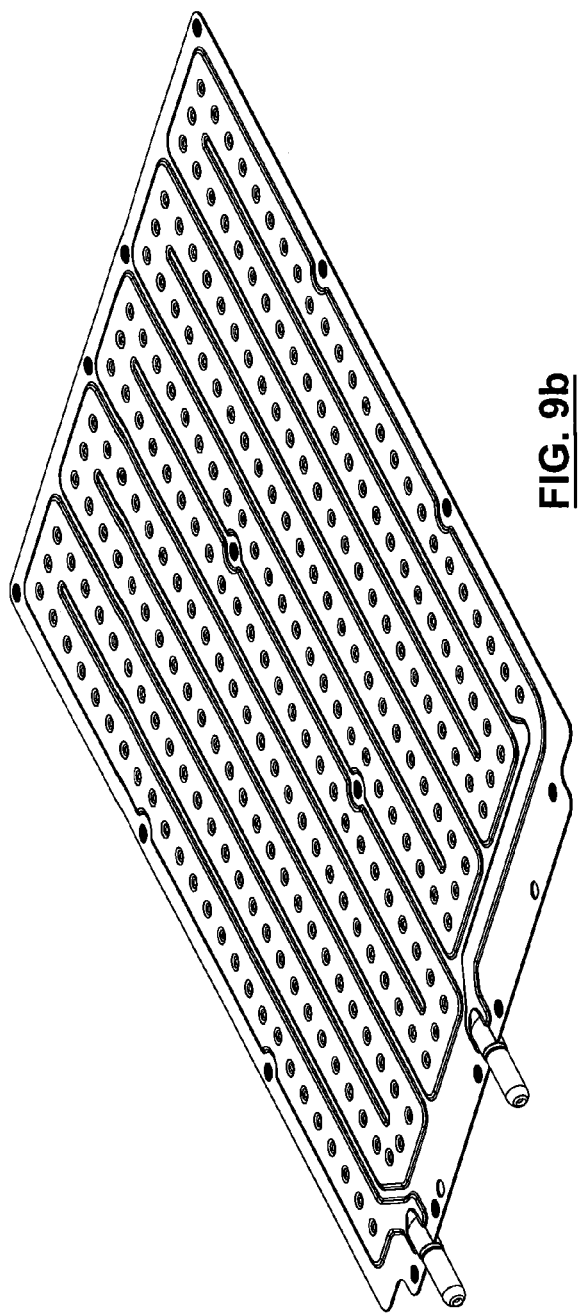
FIG. 9 (a-e) disclose a battery cell cooler in accordance with another embodiment of the description.
Figure 9E:
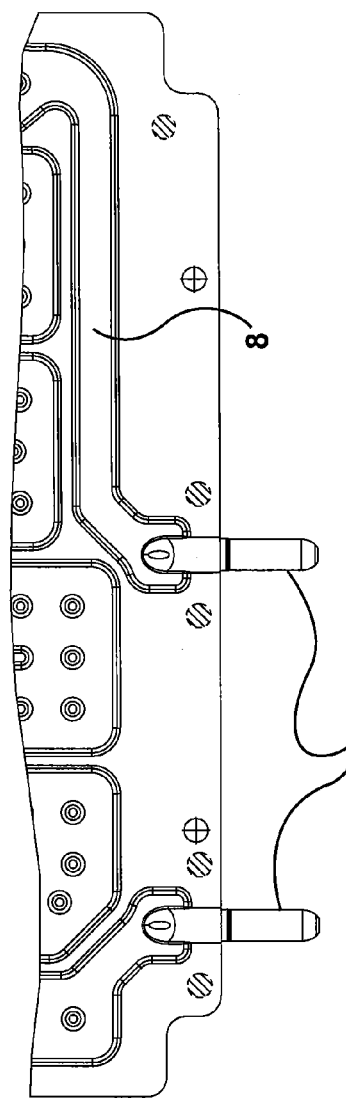

As shown in FIGS. 2, 3 and 4, the battery cell cooler (2) can be provided with brackets (17) that are adapted for receiving the inlet and/or outlet ducts (18, 20). Such brackets (17) can assist in retaining the inlet and outlet ducts (18, 20) in position in the battery cell cooler (2).

Figure 10B:
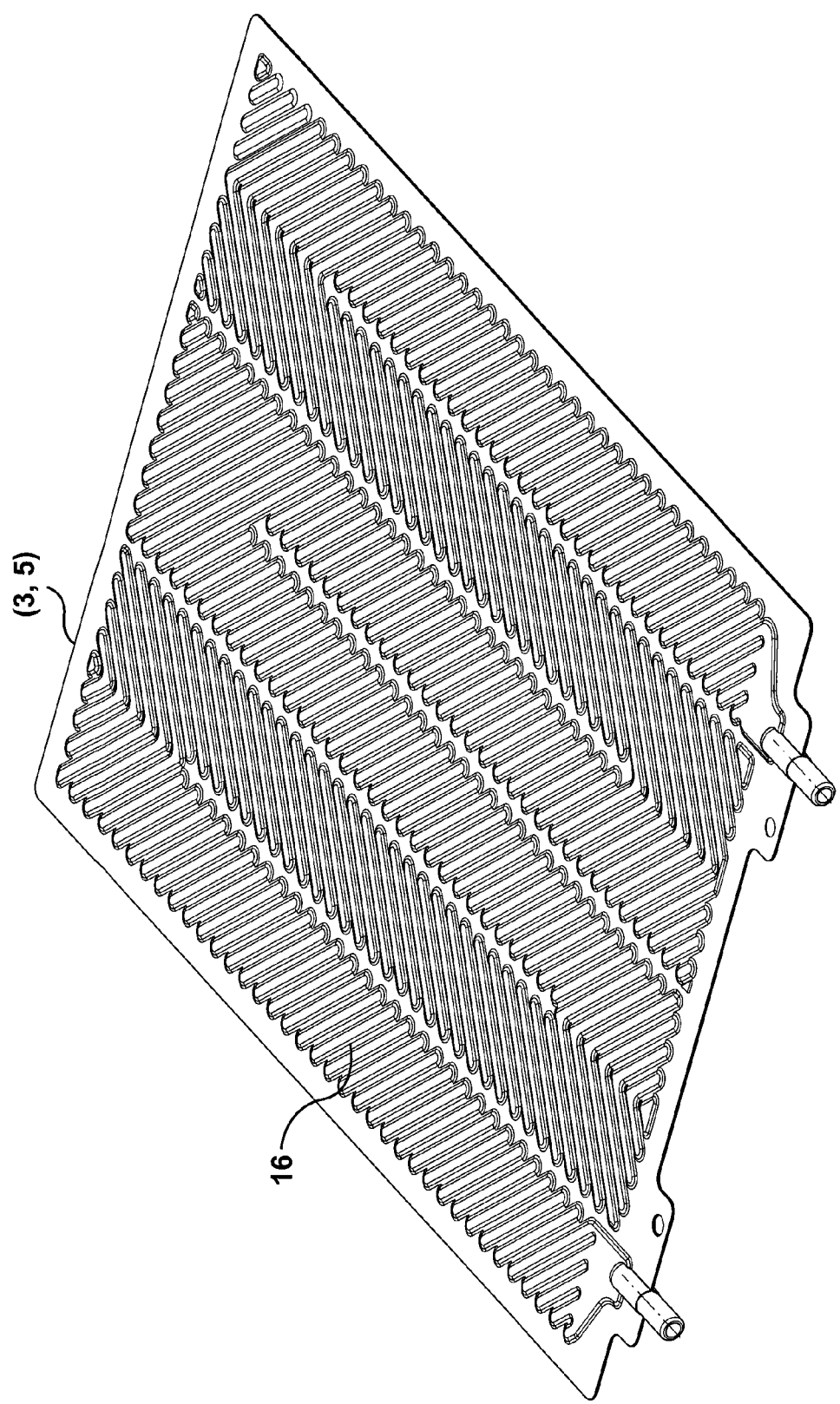
FIG. 10 (a-c) disclose a battery cell cooler in accordance with a further embodiment of the description.

In one embodiment of the battery cell cooler (2) described herein, the flow passage (6) is provided with dimples (14) along the length of the flow passage (6). In another embodiment, the battery cell cooler (2) is provided with ribs (16) (FIG. 10). The geometry and spacing of the dimples (14) or ribs (16) can be adjusted to provide strength so that flow passages having a larger cross-section can be prepared, while being able to provide the desired heat transfer, as well as meeting the pressure drop requirements for battery cell coolers (2). As shown in FIGS. 2-9, the dimples (14) can be positioned centrally along the length of the flow passage (6) on one or both of the plates (3, 5), while the ribs (16) can be positioned at an angle (FIG. 10) along the length of the flow passage (6). In an alternative embodiment, the dimples (14) may be arranged with some degree of offset, or they may be staggered with respect to the direction of flow. In the case of ribbed constructions, the ribs (16) may be angled such that intersecting interstices are formed between the mating plates; the contacting interstices can provide structural support.

In another embodiment of the battery cell cooler (2) described herein, the flow passage (6) is provided with a P-shaped narrowing (30) of the outermost channel, near the coolant exit. Without being limited to the embodiments disclosed, such P-shaped narrowing can also be present on the coolant entry side, or both the coolant entry and exit. In the figures (in particular FIGS. 5 and 7), the P-shaped narrowing (30) is present where the dimples end and the channel narrows in width just as it turns 90°. The turn, however, does not need to be 90° and can be more or less depending upon the particular application and need. During application, the plate coolers (3, 5) are oriented in the vertical plane, and entrapment of air in the fine channels can be a concern. The use of such P-shaped narrowing (30) can assist in pushing any trapped air bubbles upwards, such that flowing liquid coolant flow can carry them away. It should be understood that a P-shape is not limiting, that alternate shapes that achieve similar upwards narrowing of the flow passage, may have similar utility.

In a further embodiment of the battery cell cooler (2) described herein, the corners of the flow passage (6) are rounded, particularly those that have a large radius at the beginning and the end of each flow passage, which can allow the turning of the fluid to be in more conformity with the flow streamlines of the flow passage (6). Increasing the radii, i.e. going from sharp turns to rounding off of the corners, can permit easier fluid turning and easier sweeping away of air bubbles.

Each of the complementary plates (3, 5) used to form the battery cell cooler (2) can have a symmetrical geometry. In one embodiment, for example and without limitation, the plates (3, 5) are symmetrical about their longitudinal axis such that a single die can be used to form both plates (FIGS. 2-4 and 8). Alternatively, the plates can be formed as having an asymmetric geometry, requiring separate dies for each of the mating plates (3, 5) (FIGS. 5-7 and 9). The choice of battery cell cooler (2) having either symmetrical or asymmetrical with identical or different plates depends upon the need and design of the battery cell cooler (2). The two complementary plates can then be brazed together to create sealed internal flow passages, and thus to form a battery cell cooler (2).

To form the tubular section (8) in the symmetrical plate design, the plates (3, 5) described above can be integrally pierced and shaped to form connecting tube brackets (17) (FIGS. 2-4 and 8) by punching out the bracket shape from the same cooler plate, and forming it into a cupped shape to be able to receive a connector tube (inlet or outlet duct that may be laid or clipped into this bracket for support (FIG. 2-4), prior to brazing. The brackets are located relative to the longitudinal axis to maintain plate symmetry, so that the mating bracket features line up after assembly. Therefore, the embodiment disclosed in FIGS. 2-4 has a symmetric plate with symmetric connector tube support brackets. Alternatively, the plates in the symmetrical design can be constructed with integrally formed fluid passages that eliminate the need for tube support brackets and cross-plate connecting tubes (as shown FIGS. 5-7 and 9 disclosing the asymmetric plates). In this case, additional features or local flattening or restriction of this channel is needed to separate the inlet and outlet flow paths.

The battery cell cooler (2) disclosed herein can further undergo a process to laminate a plastic film onto the heat exchanger plates (3, 5) for electrical isolation from the contacting battery cells. In a further embodiment, the battery cell cooler plates (3, 5) can have an outer surface condition, applied plastic film or other coating that is not a significant thermal conduction barrier, yet still provides an extra layer of electrical isolation from the contacting battery cells (4).

As shown in the figures, the flow passage (6) can have a serpentine shape. Other geometries of the flow passage (6) can also be used depending upon the need and design requirements.

In one embodiment, the flow passages can be provided with indentations (22). Such indentations (22) can provide further strength to the flow passage (6) depending upon the design and other requirements of the battery cell cooler (2). Or, they may be used for local narrowing of the flow passage for increased flow mixing; or, they may be used to provide space for mechanical clinching assembly features.

As described above, one or more tubular sections (8) are provided with an inlet duct (18) and an outlet duct (20). In one embodiment, the inlet and outlet ducts (18, 20) can be so positioned on the battery cell cooler (2) so that they are asymmetrical, as shown in the FIGS. 2-9. Alternatively, the inlet and outlet ducts (18, 20) can be symmetrical, as shown in FIG. 10.

The battery cell cooler (2) described herein can have a thin profile (FIGS. 9c, 9d and 10c), which can help with minimizes the space occupied by such coolers (2). One of the concerns present in the art is to provide a battery cell cooler (2) having wide channels. As the width of the channels increases, the integrity of the cooler (2) and the channels decreases. The battery cell cooler (2), as described herein, can be prepared to have wide channels, and can provide sufficient strength, desired heat transfer capability and accommodating pressure drops. In one embodiment, the channels can be as wide as 11 mm, but appreciably wider channels can be formed, such as, for example, 12 to 22 mm, and all values in between, based on application requirements.

To preserve battery pack energy storage density (i.e. compactness of battery system per unit energy storage capacity), closely spaced cells and battery coolers can be desired. Hence, very thin battery coolers can be desired, and also that they be manufactured from very thin material, such as, for example and without limitation, aluminum. A preferred construction is brazed aluminum, to achieve sealing of the liquid cooling channels and tube connections; and using clad aluminum brazing sheet material to provide a source of filler metal for brazing. Yet, it is desired that the battery coolers be flat to maintain good thermal contact with the adjacent battery cells. As thin and flat battery coolers are desired, controlling flatness and alignment during assembly and brazing can be challenging. Also, the braze joint at the inlet/outlet port receptacle to the connecting tube joining location can be challenging. Different clinching means can be used prior to brazing to address the above concerns, including use of a mechanical clinching process to mechanically join the plates at least along their central axis, after alignment and before brazing. For example, a TOX® clinching operation, although in the cooler described herein, the clinch dimples are flattened after clinching. Further, a dimpling pinch staking of the connector tube (inlet and/or outlet duct) to port receptacle can be performed during alignment/clinching, and prior to brazing.

Certain adaptations and modifications of the described embodiments can be made. Therefore, the above discussed embodiments are considered to be illustrative and not restrictive.

What is claimed is:

1. A battery cell cooler comprising:
    a pair of complementary thin plates, the pair of complementary thin plates together forming a serpentine shaped tubular flow passage;
    the flow passage having an inlet end, an outlet end and dimples or ribs along the length of the flow passage; and
    an inlet duct being coupled to an expanded receptacle at the inlet end and in fluid communication with the inlet end of the flow passage and an outlet duct being coupled to an expanded receptacle at the outlet end and in fluid communication with the outlet end of the flow passage; and
    wherein the flow passage width proximate to the both the inlet and outlet end is narrower than width of the flow passage in other sections of the plate;
    wherein the expanded receptacles formed by the plate pair have a diameter, the diameter being greater than the thickness of the tubular flow passage; and each of the expanded receptacles having a flattened clinching dimple for clinching the inlet or outlet duct to the expanded receptacle.

2. The battery cell cooler according to claim 1, wherein the flow passage has dimples positioned centrally along the length of the flow passage.

3. The battery cell cooler according to claim 1, wherein the flow passage has dimples staggered along the length of the flow passage.

4. The battery cell cooler according to claim 1, wherein the plates are symmetrical and each of the complementary plates is identical.

5. The battery cell cooler according to claim 1, wherein the plates are asymmetrical.

6. The battery cell cooler according to claim 1, wherein the inlet duct and the outlet duct are formed from tubes and the plates further comprising brackets for supporting the tubes.

7. The battery cell cooler according to claim 1, wherein the narrow width of the flow passage forms a P-shaped narrowing, and located such that channel narrowing is uppermost relative to plate orientation.

8. A device comprising a battery cell sandwiched between a pair of battery cell coolers, each battery cell cooler comprising:
    a pair of complementary thin plates, the pair of complementary thin plates together forming a serpentine shaped tubular flow passage and one or more tubular sections;
    the flow passage having an inlet end, an outlet end and dimples or ribs along the length of the flow passage; and
    an inlet duct being coupled to an expanded receptacle at the inlet end and in fluid communication with the inlet end of the flow passage and an outlet duct being coupled to an expanded receptacle at the outlet end and in fluid communication with the outlet end of the flow passage; and
    wherein the flow passage width proximate to both the inlet and outlet end, is narrower than width of the flow passage in other sections of the plate;
    wherein the expanded receptacles formed by the plate pair have a diameter, the diameter being greater than the thickness of the tubular flow passage; and each of the expanded receptacles having a flattened clinching dimple for clinching the inlet or outlet duct to the expanded receptacle.

9. The device according to claim 8, wherein the flow passage has dimples positioned centrally along the length of the flow passage.

10. The device according to claim 8, wherein the plates are symmetrical and each of the complementary plates is identical.

11. The device according to claim 8, wherein the plates are asymmetrical.

12. The device according to claim 8, wherein the inlet duct and the outlet duct are formed from tubes and the plates further comprising brackets for supporting the tubes.

13. The device according to claim 8, wherein the flow passage further comprises a P-shaped narrowing.

14. The device according to claim 13, wherein the P-shaped narrowing is proximate to the inlet end, outlet end, or both the inlet and outlet end of the flow passage.

* * * * *